(12) United States Patent
Dunn et al.

(10) Patent No.: US 7,034,714 B2
(45) Date of Patent: Apr. 25, 2006

(54) VEHICLE HIGH SECURITY PIGGYBACK MODULES

(75) Inventors: Stuart Michael Dunn, Chelmsford (GB); Simon John William Hurr, Grays (GB); Adi Vimal, Basildon (GB)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 10/248,598

(22) Filed: Jan. 31, 2003

(65) Prior Publication Data

US 2004/0150509 A1 Aug. 5, 2004

(51) Int. Cl.
*G08C 19/00* (2006.01)
*G05B 19/00* (2006.01)
*G06F 7/00* (2006.01)
*G08B 29/00* (2006.01)
*H04B 1/00* (2006.01)

(52) U.S. Cl. .................. 340/825.69; 340/5.2; 340/5.7

(58) Field of Classification Search ........... 340/825.69, 340/825.72, 5.2, 5.7; 307/10; 380/20, 21, 380/23, 25, 45; 701/49; 713/178
See application file for complete search history.

(56) References Cited

U.S. PATENT DOCUMENTS

| | | | |
|---|---|---|---|
| 4,723,121 A | 2/1988 | van den Boom et al. | |
| 5,144,667 A * | 9/1992 | Pogue et al. | 380/45 |
| 5,995,013 A * | 11/1999 | Yoshizawa et al. | 340/5.23 |
| 6,043,752 A | 3/2000 | Hisada et al. | |
| 6,130,623 A * | 10/2000 | MacLellan et al. | 340/5.1 |
| 6,297,731 B1 | 10/2001 | Flick | |
| 6,738,697 B1 * | 5/2004 | Breed | 701/29 |
| 6,799,272 B1 * | 9/2004 | Urata | 713/171 |
| 6,801,134 B1 * | 10/2004 | Juzswik | 340/825.69 |

* cited by examiner

*Primary Examiner*—Michael Horabik
*Assistant Examiner*—Nam Nguyen
(74) *Attorney, Agent, or Firm*—Frank A. MacKenzie

(57) ABSTRACT

A vehicle control system includes a conventional electrical locking system in tandem with a system providing an encrypted code sent along a CAN (Control Area Network) link to unlock the vehicle.

5 Claims, 2 Drawing Sheets

VEHICLE HIGH SECURITY PIGGYBACK MODULES

BACKGROUND OF INVENTION

1. Field of the Invention

The invention relates to the field of vehicle control systems, and, more particularly to vehicle remote control systems and related methods.

2. Background of the Invention

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, window, and also movement of the vehicle or within the vehicle. Ultrasonic and microwave motion detectors, differential pressure sensors, and switches may be used as sensors. In addition, radar sensors may be used to monitor the area proximate the vehicle.

The controller typically operates to give an alarm indication in the event of triggering of a vehicle sensor. The alarm indication can be of various types including horn, siren, lights, or other.

Current vehicle security systems use conventional electric wiring signals to lock, double lock and unlock the latches. These systems can be easily overcome once access is gained to the wiring harness and power is supplied to the unlock wire.

U.S. Pat. No. 6,297,731 issued Oct. 2, 2001 to Flick teaches a vehicle control system including a data communications bus, a remote keyless entry (RKE) system, and a piggyback controller at the vehicle for performing a desired function based upon predetermined RKE signals generated on the data communications bus by the RKE controller. The piggyback controller permits addition of one or more new remote control functions to a vehicle already including a remote keyless entry system and a data communications bus.

It would be desirable to provide a higher degree of vehicle security. An encrypted system in tandem with a conventional actuation system could provide such enhanced security in accordance with an embodiment of this invention.

SUMMARY OF INVENTION

In view of the foregoing background, this invention provides a system and associated methods for providing high vehicle security. This system can work in tandem with current known double locking latch system to provide a highly secure system. This system can use the current system and electrical wire harness loom in combination. In addition, modules can be added to the Central Security System (CSM) and latches and can be linked by a Control Area Network (CAN) bus link. This additional equipment can plug directly into the current system and can provide an encrypted code sent along the CAN bus link as well as using the conventional electrical signal to unlock the latches. Processing software uses the two signals to decide if a valid command has been requested. This system would be very difficult to overcome due to the need to decode the encryption on the CAN bus link to provide an unlock signal.

Also, in accordance with an embodiment of this invention, there is added a heart beat sensor to sense any living being in the vehicle. If a heartbeat is detected, the vehicle will not be allowed to double lock.

A car dealer can fit a system in accordance with an embodiment of this invention to a vehicle already in the marketplace.

Accordingly, the invention teaches using a piggy back module to provide a) authentication of signal and b) authentication of component identification (in case a thief tries to splice into the wire harness with a surrogate module from another car) in order to reduce the risk of illegal entry to the vehicle.

This invention offers an improvement over the prior art in that a standard wire harness (wire loom) provides the actuating electrical power to the electronic actuator, such as a window motor, latch motor, or other vehicle actuator system, and there is a requirement for an additional encrypted CAN signal to supply a double check function.

DETAILED DESCRIPTION

The present invention will now be described more fully hereinafter with reference to the accompanying drawings, in which the preferred embodiments of the invention are shown. This invention, may however, be embodied in many different forms and should not be construed as limited to the embodiments set forth herein.

Figure 1:
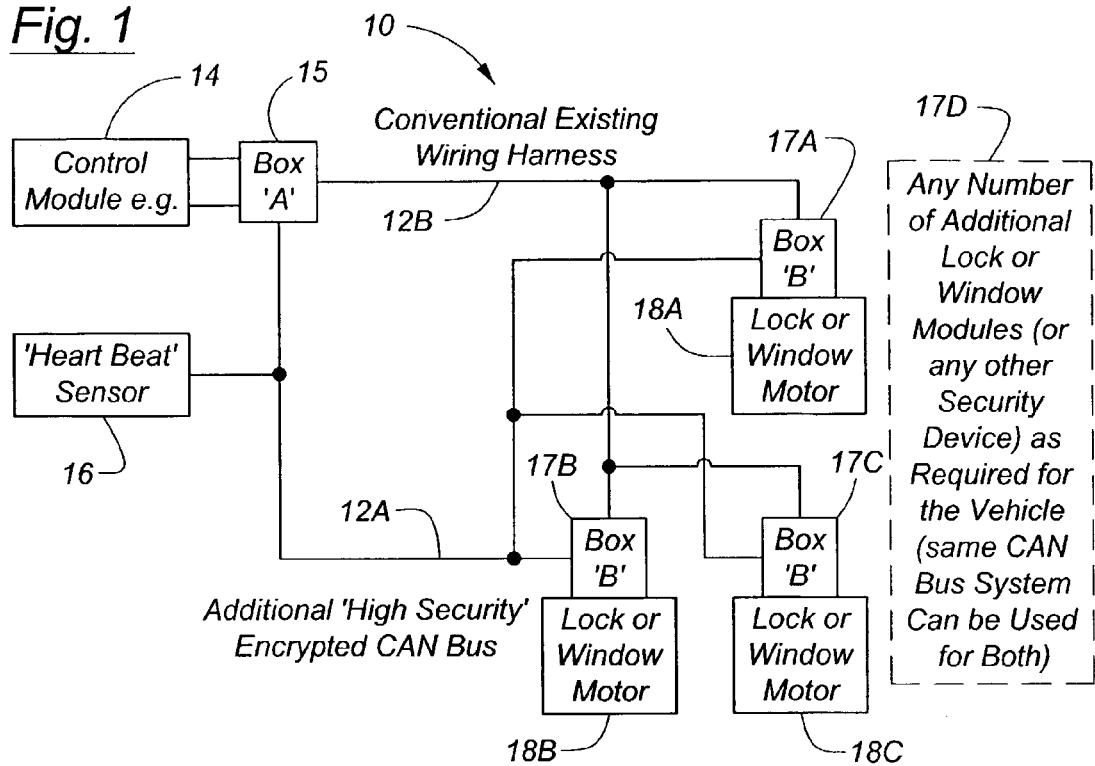
FIG. 1 is a schematic block diagram of a vehicle control system including an RKE system and an alarm controller in accordance with an embodiment of this invention.

Referring initially to FIG. 1, an embodiment of a vehicle control system 10 is now described. The system 10 includes a wiring harness 12 having a conventional wiring component 12B and a high security wiring component 12A. Vehicle control module 14 and an associated control gateway 15 are coupled to wiring harness 12, including couplings to both conventional wiring component 12B and high security wiring component 12A. Control module 14 may include any number of various vehicle systems such as central security or window control modules. A heart beat sensor 16 is coupled to wiring harness 12. A plurality of activation gateways 17 (17a, 17b, 17c, and so on) for functions such as locking, window activation, and so on) are coupled through a plurality of activation motors 18 (18a, 18b, 18c, and so on).

Control gateway 15 is positioned between control module 14 and wiring harness 12. Security or safety specific instructions are encrypted by control gateway 15 and sent on the high security wiring component 12A of wiring harness 12. Such instructions can include unlocking, double locking for doors, raising and or lowering windows, and so on.

Activation gateways 17 advantageously include a comparator and decoder (CAN decoder) that plugs directly onto a standard door latch, window motor, or other device to be activated. Activation gateways 17 check the signals on wiring harness 12, both convention wiring component 12B and high security wiring component 12A for command signals. Activation gateways 17 decode the CAN bus signal and perform a comparison of the signals on conventional wiring component 12B and high security component 12A. If the requested command is the same and is present on both the standard vehicle wire harness 12B and the high security wiring component 12A, the system will allow the function to take place. That is, a normal signal on wiring harness 12 is applied to the lock actuator or window motor or the like. By having a heart beat sensor 16 coupled to activation gateways 17 it can be determined if there is a heart beat and then logic can be used to determine if a command to activation modules is desired or undesired. For example, if a body is detected inside the car, the double locking will not work. Similarly, if no body is detected inside the vehicle, the window will not lower.

Both gateways 15 and 17 may have logic analysis capability built in, and have an electronic identification verified by the CAN bus. Any module substitution, such as in a theft attempt, would render the system inoperative. Advantageously, gateways 15 and 17 have shielded connectors.

Figure 2:
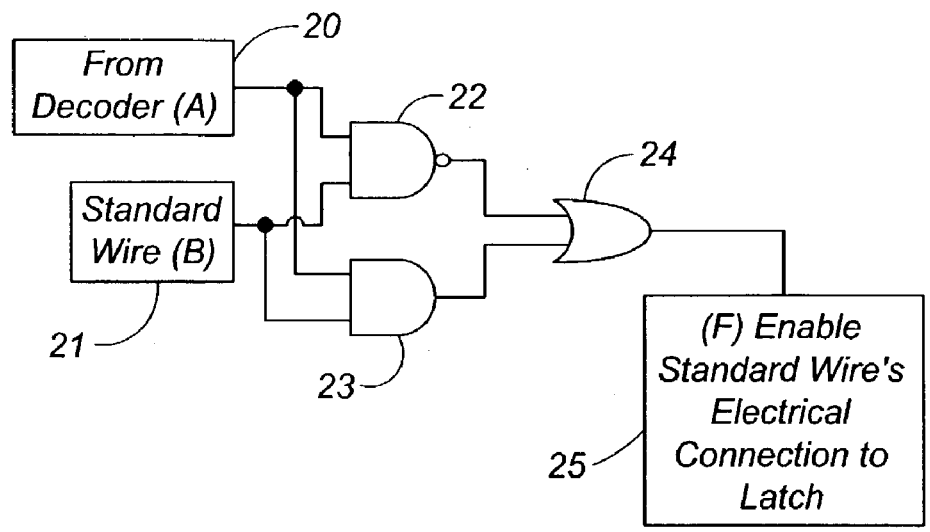
FIG. 2 is a logic diagram for each of 3 line signals (lock, double lock, unlock) for post-piggy back door module processing.

Referring to FIG. 2, the logic for using a conventional signal in combination with a tandem high security system is illustrated. That is, a conventional signal and an encrypted, high security signal must both be present within a predetermined time period for any actuation of a vehicle component to take place. That is, the comparator logic illustrated is typically located in gateways 17, and can be used to assess the status of any command signals from CSM to latch or from latch to CSM. Such a system is applied to signals going to the latch, i.e. lock, unlock, double lock from the CSM, and signals from the latch to the CSM, i.e. set alarm, reset alarm, global unlock, lock, double lock. If desired, an encryption/decoding protocol is also used. An input from a decoder A 20 and an input from standard wire B 21 are each applied to the inputs of a NAND gate 22 and an AND gate 23. The outputs of NAND gate 22 and AND gate 23 are each applied to the input of an NOR gate 24. The output of NOR gate 24, F, enables a standard wire electrical connection to a latch 25. The logic for such a gate arrangement is F=(not (A.B))+A.B for each individual latch command wire, i.e. an exclusive NOR gate.

Therefore, such a gate arrangement is included within the latch piggyback module and acts as a comparator. This means that as long as the decoded, high security, signal matches the signal also present on the standard wiring loom in the vehicle door, the output F enables the current to flow from the standard loom to the latch. Therefore, there is an electronic switch, typically part of gateways 17, between each of the lock, double lock and unlock wires on the loom and their respective connections in the latch. The logic gates enable the electronic switches.

Further, gateways 17 can command the entire vehicle to unlock, lock or double lock. There are switches inside gateways 17 that give these commands to the central security modules actuated when you turn the key to certain positions. In this case, the latch piggyback modules will encrypt this signal, and send it along the encrypted link. The standard wire loom will also have this command present. The CSM piggyback unit will decode the encrypted signal and employ exactly the same logic as shown above to decide if it is a legal command. If the comparator agrees, the command line will be enabled such that the CSM receives the command from the latch.

Accordingly, a system in accordance with an embodiment of this invention provides a higher level of vehicle security for customers. The system works in tandem with current double locking latch systems to provide a highly secure system. The system uses the current system and electrical wiring harness loom. In addition, modules are added to the Central Security Module (CSM) and latches and are linked by a CAN BUS link. The modules are shielded as they mount to the CSM/latches to prevent them being tampered with. The system can also attach to the window control modules or any other device that controls vehicle security.

This then also allows the control of fuel pumps, injectors and ignition systems. Each module will contain an electronic identification (ID) that the other modules in the system will learn upon installation. This will prevent an unauthorized modules being substituted in to the system. This ID exchange will be used during unlock commands to verify the request. This additional equipment which plugs directly into the current system provides an encrypted code sent along the CAN link as well as using the conventional electrical signal to unlock the latches. The modules will decode the CAN BUS signals and compare it to the conventional signal over an "x" millisecond time frame. If the time frame is exceeded the latch will not open. During this command the electronic ID's will be exchanged to determine authenticity. This system would be very difficult to overcome due to the need to decode the encryption on the CAN link to provide a unlock signal as well as provide the correct electronic ID and conventional power signal. The conventional power signal will be used to supply power to the modules, which eliminates the need for further wiring. The modules are then only live when action is required which prevents additional current drain on the vehicle. The system would have a timed access feature so that if an unauthorized action was completed the system would not allow any unlocking for a set time period (i.e. 10 minutes). The system can be set so that a set number of failed attempts (i.e. 3) would permanently lock the system. Resetting would require dealership diagnostics.

This system requires that two signals and an ID exchange occur within a set time frame (milliseconds) for the latches to operate. A heartbeat sensor can be used to detect any living being in the vehicle. If a heartbeat is detected, the system will not double lock. Additionally, if the system is locked and no life is sensed in the vehicle it can prevent the windows from being lowered via the switch. This will stop a thief attempting entry in this way.

It is to be understood that the invention is not to be limited to the specific embodiments disclosed, and that modifications and embodiments are intended to be included within the scope of the appended claims.

The invention claimed is:

1. A vehicle high security piggyback module system adapted to be used in conjunction with a double locking latch system for a vehicle, said module system including:
   an electrical wiring harness loom;
   an information link to carry encrypted actuation signals and conventional electrical actuation signals;
   processing software to detect a first encrypted signal and a second conventional signal, and to determine whether or not the first and second signals have been detected within a predetermined period of time; and
   authorizing software to permit further activation only if the first and the second signals have been detected within the predetermined period of time.

2. A vehicle high security piggyback module system as recited in claim 1 further including a heartbeat sensor for providing a signal indicating the presence of a heartbeat inside the vehicle, and heartbeat processing means for deactivating locking features if a heartbeat signal is present inside the vehicle, and for activating locking features if no heartbeat signal is present inside the vehicle.

3. A method of controlling actuation of vehicle control systems including the steps of:
   generating a first encrypted actuating signal for denoting actuation of a vehicle system;
   generating a second conventional actuating signal denoting actuation of a vehicle system;

establishing a predetermined time period during which receipt of the first and second actuating signals is to occur;

sensing a predetermined time period between actuating signals; and enabling vehicle system actuation if the first and second actuation signals have been received within the predetermined period of time.

4. A method of controlling actuation of a vehicle control system as recited in claim 3 including:

a. identifying vehicle components with an identification signal; and b. establishing a set time frame within which two actuating signals and an identification signal exchange are required.

5. A vehicle control system including:

a piggyback module to provide (a) authentication of an actuation of an actuation signal and (b) authentication of a vehicle component identification in order to provide control of vehicle systems;

a standard wire harness to provide an activating power to an electronic actuator (window motor, latch motor etc.); and an encryption module for generating an encrypted control area network (CAN) signal to provide a double check function of actuation of any vehicle component.

\* \* \* \* \*